United States Patent

[11] 3,562,565

| [72] | Inventors | Toshimitsu Higashino<br>Inazawa-shi;<br>Sinichi Inagaki, Anjo-shi, Japan |
|---|---|---|
| [21] | Appl. No. | 856,068 |
| [22] | Filed | Sept. 8, 1969 |
| [45] | Patented | Feb. 9, 1971 |
| [73] | Assignee | Nippon Denso Kabushiki Kaisha<br>Kariya-shi, Japan<br>a corporation of Japan |
| [32] | Priority | Nov. 27, 1968, Dec. 12, 1968 |
| [33] | | Japan |
| [31] | | 43/87229 and 43/108645 |

[54] DC MOTOR CONTAINING A BRAKE MEANS
3 Claims, 8 Drawing Figs.

[52] U.S. Cl. ..................................................... 310/77
[51] Int. Cl. ....................................................... H02k 7/112
[50] Field of Search........................................... 310/76, 77;
318/372; 188/171

[56] References Cited
UNITED STATES PATENTS

| 2,482,840 | 9/1949 | Collins et al. ................. | 310/77X |
| 2,520,204 | 8/1950 | Hancock ....................... | 188/171 |
| 2,536,491 | 1/1951 | Chapman et al. .............. | 310/77 |

Primary Examiner—D. F. Duggan
Attorney—Cushman, Darby & Cushman

ABSTRACT: A DC motor which contains a novel brake means within it, said brake means comprising a magnetic disc which is pressed against the cooling fan of the motor by means of springs when the motor is not energized, but which is automatically separated from the fan by the magnetic force produced by the field windings when the motor is energized thereby to relieve the braking force.

INVENTORS
Toshimitsu Higashino
Sinichi Inagaki
BY Cushman, Darby & Cushman
ATTORNEYS INVENTORS
Toshimitsu Higashino
Sinichi Inagaki
BY Cushman, Darby & Cushman
ATTORNEYS

//3,562,565

DC MOTOR CONTAINING A BRAKE MEANS

BACKGROUND OF THE INVENTION

1. Field of the Invention

The present invention relates to a DC motor which is provided with a brake means.

2. Description of the Prior Art

As is well known, the braking devices which have been hitherto offered for use with DC motors include electrical braking mechanisms such as a dynamic braking wherein at the time of braking a DC motor is caused to function as a DC generator so that the generated power is dissipated through a resistor to thereby effect a braking action and mechanical braking devices wherein, for the braking action, a fixed clutch plate is pressed against a rotating clutch plate secured to a rotor shaft to cause the latter to operate electromagnetically or in a mechanical manner.

However, the electrical braking devices of the former type of the prior art devices, particularly when used with series wound or compound wound DC motors, were open to the objection that not only did they require a number of electrical component parts such as a relay switch and the like which resulted in complicated wiring which had a tendency to break down easily and thereby reduced reliability, but also the reduced retarding torque due to a decrease in the revolutions of the DC motor extended the stopping time considerably, so that during the low speed operation just prior to the stopping of the motor, the retarding torque would drop almost to zero, thus failing to effect a braking action. Such being the case, these prior art devices could not be used with those DC motors which were employed particularly as motive power for such electrical apparatus as electrically-driven tools for home use and electrical machines for gardening including a lawnmower, for example, wherein, for the sake of safety, the DC motor must be stopped immediately the source is disconnected. On the other hand, the aforesaid mechanical braking devices of the latter had a drawback that because the electromagnetic clutch was expensive and moreover it was both heavy and bulky, requiring much space, the use of such mechanical braking devices with those DC motors which were adapted to be used as motive power for apparatus, particularly small, movable and portable electrical apparatus such as the electrically-driven home-service tools presented a very serious problem.

SUMMARY OF THE INVENTION

In order to eliminate the aforesaid drawbacks, the present invention has for its object the provision of an inexpensive DC motor provided with a brake means wherein a magnetic disc is disposed concentrically with a yoke between the field windings and a cooling fan of the DC motor to establish a magnetic path between the pole faces and between said pole faces and the yoke, and said magnetic disc is provided with spring members adapted to exert unidirectional forces such that when said field windings are energized said magnetic disc is attracted by the magnetomotive forces of said field windings away from said cooling fan towards said field windings against the forces of said spring members and when said field windings are deenergized said magnetic disc is pressed against the fan under the forces of the spring members to brake the fan and an armature connected to the motor, whereby a method of utilizing the leakage flux of the motor is provided which is simple and requires little space and which is capable of positively maintaining the retarding torque to the last moment.

This invention will be clarified by the following description given in connection with embodiments of the invention and with reference to the accompanying drawings.

BRIEF DESCRIPTION OF THE DRAWING

In the drawing, the same reference numerals designate identical or equivalent component parts.

DESCRIPTION OF THE PREFERRED EMBODIMENTS

Figure 1:
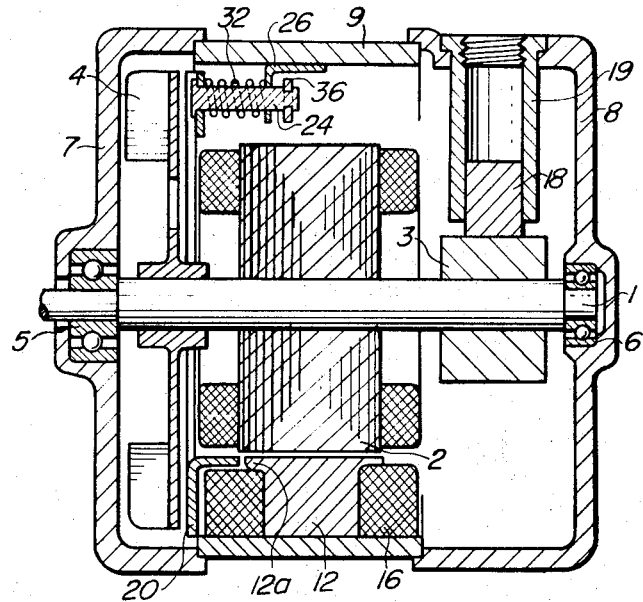
FIG. 1 is a longitudinal sectional view showing an embodiment of the DC motor with a brake means, in operation, according to the present invention.

In FIGS. 1 through 5, numeral 1 designates an armature shaft; 2 an armature; 3 a commutator; 4 a cooling fan securely mounted on the armature shaft 1 opposite to the commutator 3. Numerals 5 and 6 designate bearings journaling the armature shaft 1 at the ends thereof; 7 and 8, end brackets supporting the bearings 7 and 8 on the fan and the commutator sides, respectively. Numeral 9 designates a yoke; 10, 11, 12 and 13, field poles; 10a, 11a, 12a and 13a, pole faces of said poles 10, 11, 12 and 13; 14, 15, 16 and 17, field windings wound around the poles 10, 11, 12 and 13. Numeral 18 designates a brush and 19 designates a brush holder. Numeral 20 designates an annular magnetic disc having on its inner surface nails 20a, 20b, 20c and 20d cut and bent so that they align axially with the pole faces 10a, 11a, 12a and 13a of the poles 10, 11, 12 and 13 in the same planes. Numerals 21, 22, 23 and 24 designate pins studded at the same intervals as the nails 20a, 20b, 20c and casing; d and grooves 21a, 22a, 23a and 24a are formed on one end each of the pins 21, 22, 23 and 24. Numerals 25, 26, 27 and 28 designate L-shaped members adapted to receive the pins and secured to the yoke 9 to be located between the poles 10, 11, 12 and 13, the pin receiving members 25, 26, 27 and 28 being provided with apertures on the projecting portions thereof. Numerals 29, 30, 31 and 32 designate compression springs fitted over the pins 21, 22, 23 and 24 which are in turn loosely inserted into the apertures 25a, 26a, 27a and 28a by means of the springs 29, 30, 31 and 32, and retaining rings 33, 34, 35 and 36 are fitted into the grooves 21a, 22a, 23a and 24a of the pins 21, 22, 23 and 24. In this way, the magnetic disc 20 is located between the cooling fan 4 and the field windings 14, 15, 16 and 17 so that when no current is supplied to the field windings 14, 15, 16 and 17, the magnetic disc 20 is urged against and stopped by the cooling fan 4 under the forces of the springs 29, 30, 31 and 32.

Figure 2:
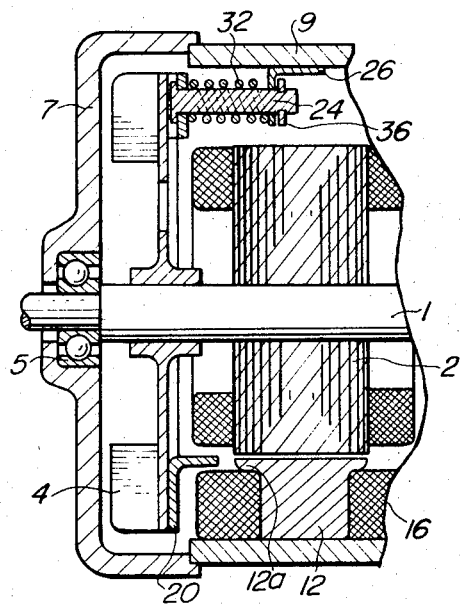
FIG. 2 is a partial longitudinal sectional view showing the motor of the present invention at the instant the braking operation is initiated.
Figure 3:
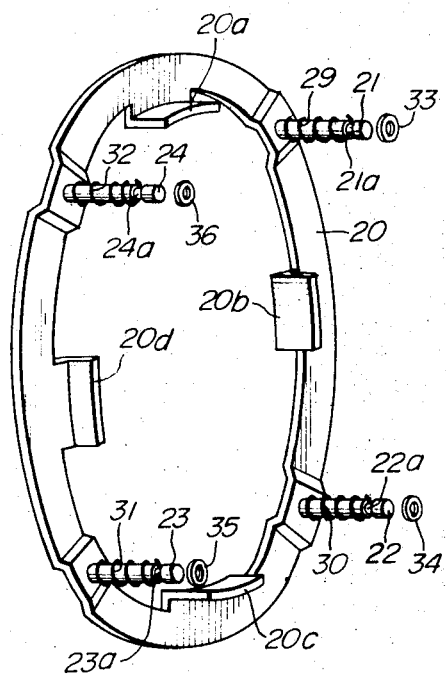
FIG. 3 is a perspective view showing the magnetic disc of said motor.
Figure 4:
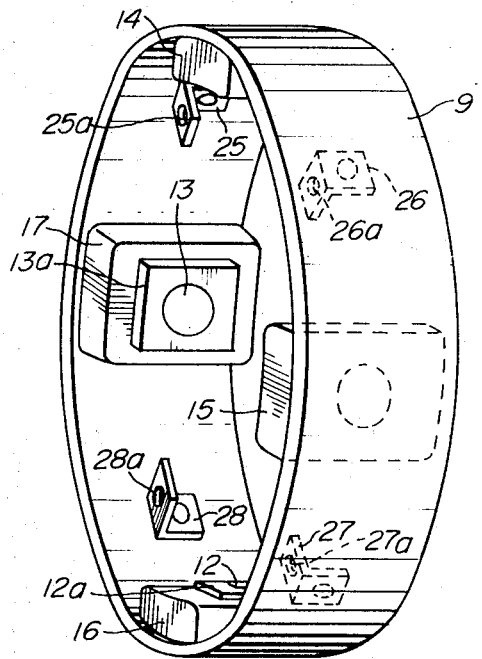
FIG. 4 is a perspective view showing the field section of said motor.
Figure 5:
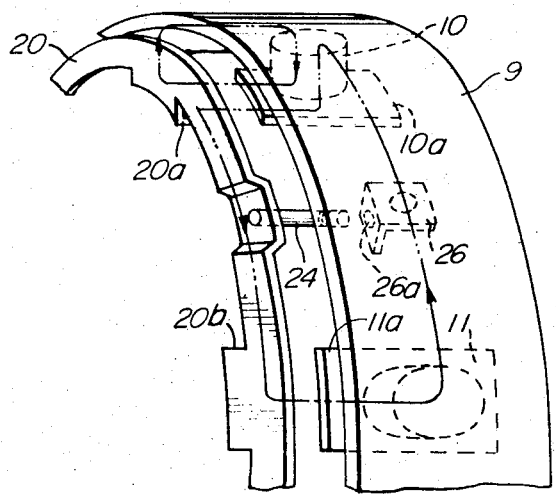
FIG. 5 is an essential perspective view showing the magnetic disc and the field section of said motor in assembled form, with the field windings removed.

With the arrangement described above, the operation of the device according to the present invention will be described hereinafter. Now assuming that a current is supplied to the field winding 14, the current flowing through the field winding 14 causes a magnetic path by the magnetomotive force which, as shown in FIG. 5 with a one-dot chain line, returns through the pole face 10a, the nail 20a of the magnetic disc 20, through the magnetic disc 20 and the yoke 9 to the pole 10, while on the other hand a magnetic path is formed, as shown with a two-dot chain line, by the magnetomotive force which returns to the pole 10 through the pole face 10a, the nail 20a of the magnetic disc 20, through the magnetic disc 20, the nail 20b, the pole face 11a and the pole 11. A similar magnetic route as established by a current flowing through the field winding 14 will be provided if a current is supplied to each of the field windings 15, 16 and 17. When this happens, the magnetic disc 20 is attracted, as shown in FIG. 2, away from the cooling fan 4 towards the field windings 14, 15, 16 and 17 against the forces of the springs 29, 30, 31 and 39. Thus, the armature is permitted to rotate smoothly without hindrance.

Figure 6:
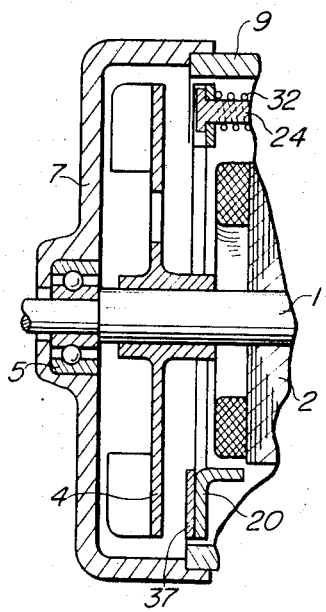
FIG. 6 is a partial sectional view showing the magnetic disc to which is attached a friction plate.

When the field windings 14, 15, 16 and 17 are deenergized, the magnetomotive forces in the field windings disappear so that the magnetic disc 20 is pressed against the cooling fan 4 under the forces of the springs 29, 30, 31 and 32 in a manner designed to brake the cooling fan 4 and consequently the armature 2 connected to the fan 4 to bring the armature to a stop quickly. In this case, the heat generated at the contact surfaces of the magnetic disc 20 and the cooling fan 4 may be removed to the atmosphere by the fan 4 since it is the fan 4 that is to be braked. Such being the case, no matter how often the DC motor is started or stopped, effecting the braking operation, each time the motor is stopped, neither the magnetic disc 20 nor 12 the cooling fan 4 will ever become exceptionally overheated. In addition, the mechanical squeaking sound which is produced each time the magnetic disc 20 is pressed against the cooling fan 4 upon the braking operation may be eliminated by securely attaching, as shown in FIG. 6, a friction plate composed of asbestos, rubber, plastics or the like to the surface of the magnetic disc 20 that contacts the cooling fan 4 thereby preventing such noise. This friction plate is also effective in attaining a large retarding torque so that the armature 2 may be stopped more quickly.

Furthermore, in the embodiment described above, as the compression springs 29, 30, 31 and 32 are provided to exert, when the field windings 14, 15, 16 and 17 are deenergized, the unidirectional forces or the forces pressing the magnetic disc 20 against the cooling fan 4 to stop it at that point, and moreover, the magnetic disc 4 is supported by means of the pins 21, 22, 23 and 24 which are studded on the disc 4 and which are loosely inserted into the apertures 25a, 26a, 27a and 28a formed on the pin receiving members 25, 26, 27 and 28 securely mounted on the yoke 9 with the retaining rings 33, 34, 35 and 36 being fitted into the grooves 21a, 22a, 23a and 24a formed on one end of the pins 21, 22, 23 and 24, when the magnetic disc 20 or the friction plate 37 attached to the magnetic disc 20 has worn out, merely the magnetic disc 20 alone need be removed without any difficulties for repair or replacement service and the remounting procedure will also be simple and easy. Further, there is no need to specifically provide a driven plate since the cooling fan also functions as a plate subject to braking action, nor there is any need to give any consideration with respect to the space required for installation of such a driven plate. Still further, as the magnetic disc 20 is maintained by loosely inserting the pins 21, 22, 23 and 24 studded on the disc 20 through the apertures 25a, 26a, 27a and 28a on the pin receiving members 25, 26, 27 and 28 securely mounted on the yoke 9, there is no need to provide any means to control the rotation of the magnetic disc 20 so that the magnetic disc 20 may be prevented from rotating along with the rotation of the fan 4 whenever the braking action is effected.

Although in the embodiment described above the spring means for attaining the unidirectional forces or the forces to urge the magnetic disc 20 towards the cooling fan 4 have been provided in the form of the compression springs 29, 30, 31 and 32, these compression springs may be replaced with tension springs which, for example, may be secured at one end each thereof to the end bracket 7 on the fan side and to the magnetic disc 20 at each other end thereof to provide the required forces to urge the magnetic disc 20 towards the cooling fan 4.

Of course, leaf springs may also be utilized to provide the required force to press the magnetic disc 20 towards the cooling fan 4. It is also evident that the friction plate 37 which has been shown as attached to the magnetic disc 20 in the previously described embodiment may be attached to the cooling fan 4. Furthermore, greater effectiveness may be achieved if the friction plate is provided in a manner as will be explained in the description to follow.

Figure 7:
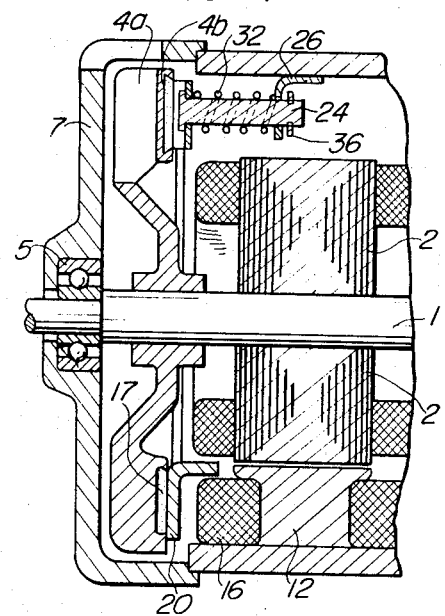
FIG. 7 is a partial longitudinal sectional view of the motor showing another embodiment wherein the friction plate is attached to the cooling fan.
Figure 8:
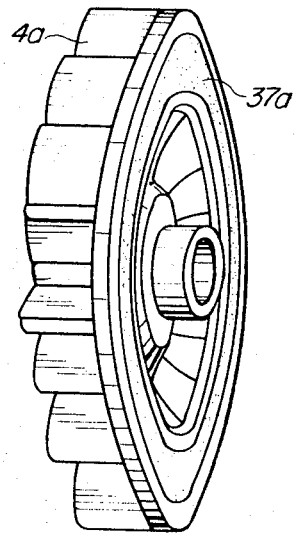
FIG. 8 is a perspective view of the fan utilized in the embodiment of FIG. 7.

As shown in FIG. 7 and FIG. 8 as well, a cooling fan 4a is formed on its face opposing the magnetic disc with an annular groove 4b having a dovetail cross section with the width of its opening being narrower than the width at the bottom. The groove 4b is filled with a lining 37a which is composed of plastic material, for example. Following the driving fit of the cooling fan 4a on the shaft 1, the surface of the lining 37a may be finished to eliminate the deviation of the axis of the fan itself as well as any lack of uniformity in the clearance between the lining-filled surface and the magnetic disc due to improper mounting of the fan on the motor shaft. Because the lining is filled and molded in the cooling fan 4a, there is no gap between the fan and the lining so that the heat generated upon the braking operation may be quickly transferred to the cooling fan to be led off to the atmosphere and the lining will never become overheated, regardless of how often the motor may be started and stopped.

Although in the embodiment just described the groove in the cooling fan is shaped to have a dovetail cross section providing its opening with a narrow width to prevent the lining from falling off the cooling fan, the cooling fan may be formed in part thereof with perforated holes through which a portion of the lining material may be extruded to provide means for preventing the extruded lining material from falling.

We claim:

1. A brake means for a DC electric motor having a casing, an armature and field poles, said brake means comprising:
   a fan connected to said armature for cooling said motor;
   a braking disc of magnetic material and mechanically biased against said fan for braking said armature;
   a plurality of pins rigidly connected to said disc;
   spring means disposed about said pins for exerting a force and mechanically biasing said disc against said fan;
   pin holders fixed to said casing for slidably holding said pins thereby slidably securing said disc to said casing; and
   said braking disc having portions disposed adjacent the inner ends of said field poles to form magnetic leakage paths therebetween for causing magnetic forces opposite to said spring force when said field poles are energized thereby sliding said disc away from said fan to permit motor operation while yet insuring braking action whenever said field poles are turned off, permitting said spring means to slide said disc against said fan.

2. A brake means as in claim 1 wherein:
   said fan includes a ringlike groove opposite said disc and having a cross section with a top width less than a bottom width; and
   a lining material filled and molded within said groove.

3. A brake means as in claim 1 wherein:
   said fan includes a ringlike groove opposite said disc and having a plurality of holes formed therethrough; and
   a lining material filled and molded within said groove and at least partially extruded through said holes.